United States Patent Office 3,560,559
Patented Feb. 2, 1971

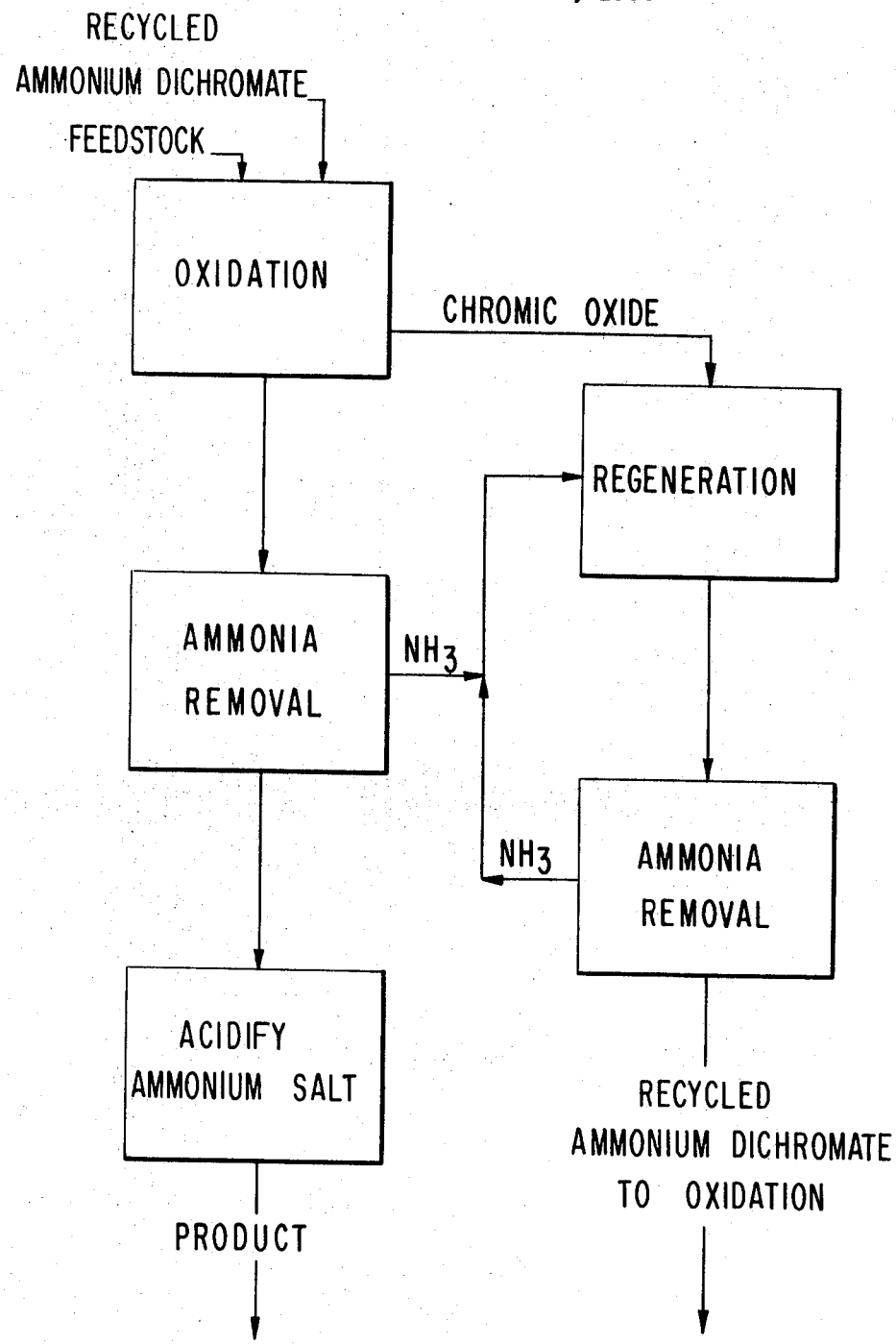

3,560,559
METHOD FOR OXIDIZING o-XYLENE, p-XYLENE AND CYCLOHEXANOL
Alvin L. Benham and Dennis E. Drayer, Littleton, Colo., and Harold D. McBride, Lincoln, Nebr., assignors to Marathon Oil Company, Findlay, Ohio, a corporation of Ohio
Filed Nov. 4, 1964, Ser. No. 408,884
Int. Cl. C07c 63/02
U.S. Cl. 260—524                              3 Claims

ABSTRACT OF THE DISCLOSURE

A process for oxidizing alkyl aromatic or cycloaliphatic hydrocarbons by contacting them with an aqueous solution of ammonium dichromate at elevated temperatures. When the pH of the reaction medium is less than about 7, the product of the reaction is the ammonium salt of an organic carboxylic acid, which, upon acidification, yields the free organic carboxylic acid. When the pH of the reaction medium is above about 7, the oxidation product is the ammonium salt of an organic carboxylic acid amide.

---

The present invention relates to the oxidation of cylic hydrocarbons and partially oxidized cyclic hydrocarbons by ammonium chromate or dichromate. More particularly, the invention relates to the oxidation of these compounds by reaction with aqueous ammonium chromate or dichromate.

Prior oxidation processes utilizing a chromium (VI) oxidant are economically unfeasible for commercial application because they result in the formation of large amounts of alkali metal halides or sulphates which are of low value. According to the present process, the production of large amounts of low value by-products is avoided and the reduced chromium compound, $Cr_2O_3$, is regenerated to the dichromate while producing the more economically attractive ammonium salts.

The following is a general description of the present process. An understanding of the major steps of the process and their inter-relation may be facilitated by reference to the accompanying flow diagram.

A feedstock containing cyclic hydrocarbons and/or partially oxidized cyclic hydrocarbons is contacted with an aqueous solution of ammonium dichromate at elevated temperatures to form various oxidation products. Depending upon the pH of the reaction media, the oxidation product formed will be either the ammonium salt of an organic carboxylic acid or an organic carboxylic acid amide.

The primary products formed by the present invention are carboxylic acids or carboxylic amides. At pH levels of about 7 or below, the predominant product is the ammonium salt of an organic carboxylic acid which can be acidified to form the free acid. When the pH of the reaction media is above about 7, high yields of carboxylic acid amides are formed.

During the oxidation reaction, the ammonium dichromate is reduced to $Cr_2O_3$ which precipitates from the reaction mixture and is removed by conventional means. After being removed from the reaction zone, the $Cr_2O_3$ is mixed with ammonium hydroxide and oxidize with oxygen to form ammonium chromate which can be converted to ammonium dichromate. The regeneration of $Cr_2O_3$ is enhanced by conducting it in the presence of catalysts, such as copper sulphate or cobalt naphthenate. In a preferred embodiment, the $Cr_2O_3$ is regenerated in the presence of a mixture of cupric sulphate and sodium sulphate. The copper ions, which detrimentally effect the oxidation reactions, are precipitated from the regeneration mixture by removing ammonia from the mixture after completion of the regeneration period.

Following the removal of the $Cr_2O_3$ from the oxidation product, water and ammonia are flashed from the hot reaction mixture. The oxidation product is then recovered. When the product is the ammonium salt of an organic carboxylic acid, it is reacted with a non-oxidizing strong acid to form the organic free acid and an ammonium salt of a strong acid.

The regeneration of $Cr_2O_3$ to form ammonium chromate is more fully disclosed in copending applications, Ser. No. 373,879, filed June 9, 1964, now Pat. No. 3,393,992, and Ser. No. 402,958, filed Oct. 9, 1964, now Pat. No. 3,369,861, both assigned to the assignee of this application.

The present invention has utility in the oxidation of a wide variety of hydrocarbons and partially oxygenated hydrocarbons. Examples of suitable feedstock materials include the xylenes, mesiylene, durene, propylbenzene, cymene, toluic acid, toluol, tolualdehyde, 2,6-dimethylnaphthalene, acenaphthene, acenaphthylene, 1,methyl-4-isopropylnaphthalene, 1,4-dimethyl-4-isopropynaphthalene, 1,3 - dimethylanthracene, 2,7 - dimethylanthracene, 1,7 - dimethylphenanthrene, 1,6-diisopropylnaphthalene, 1,2,4 - trimethylanthracene, 7-methyl-1-ethylphenanthrene, 1-methyl - 4 - isopropylanthracene, 1,3,6,8-tetramethylanthracene, 9,10-diethylphenanthrene, cyclohexane, cylcopentane, cycloheptane, cyclohexanol, and cyclopentanol. Generally, any aromatic compound substituted with a lower alkyl group can be used as a feedstock. Mixtures of hydrocarbons can also be oxidized by this procedure. An example of such a mixture is cycle oil, a product of the catayltic refining of petroleum (Industrial and Engineering Chemistry, vol. 38, pp. 136 (1946) at page 137). Generally, these products are a mixture of alkylnaphthalene, anthracene, etc.

The oxidation of the feedstock is generally accomplished by mixing the alkylaromatic or cycloaliphatic compound with an aqueous ammonium dichromate solution and heating. The reaction conditions may vary over fairly wide ranges. The oxidation temperatures which are utilized vary widely with the raw material. Thus, temperatures from about 200° to 325° C. are suitable reaction temperatures for preparation of the carboxylic acid amides are preferably carried out in the range of from 160° to 325° C. The pH of the oxidation reaction mixture can vary from about 1 to about 11, with a pH below about 7 being preferable for the preparation of high yields of organic carboxylic acid products. The ratio of dichromate equivalents to oxidizable carbon atoms which are useful in the process range from about 0.5 to 1 to in excess of 3 to 1. A ratio in the range of from about about 1.5:1 to 2.5:1 is preferred. High yields are obtained with relatively short reaction times on the order of about 15 minutes to 30 minutes. The reaction may be conducted at ambient pressures.

The oxidation reaction mixture is in two phases and the known techniques for increasing miscibility and surface area are generally applicable to the instant process. For example, surfactants can be added to the mixture to reduce the surface tension between the two phases and stirring or bubbling can be used to increase interfacial area.

After oxidation is substantially completed, ammonia and steam are removed from the reaction zone, preferably by flashing off these compounds. The precipitated chromic oxide is then removed, usually by filtration, or by other means, such as decantation. The ammonium salts of the organic acids in the reaction medium are then neutralized with a non-oxidizing strong acid, such as sulphuric acid, hydrochloric acid, hydrobromic acid, phosphoric acid, etc., to form the free organic acid which precipitates and is removed by filtration decantation or similar well-known methods.

In a preferred cyclic process, the $Cr_2O_3$ is regenerated to form ammonium dichromate. The chromic oxide is transferred to a regenerator, usually a pressure resistant vessel or autoclave, in which it is reacted with oxygen and aqueous ammonia. Generally, the chromic oxide is preferably mixed with aqueous ammonia, most of which is derived from the ammonia removal step which may be conducted as part of the process. The aqueous ammonia solution may contain from about 4% to 80% by weight of ammonia, about 15% being preferred, and the mole ratio of ammonia to chromic oxide should be from about 2 to 160. Oxygen, in the form of pure oxygen, oxygen enriched air, air, and oxygen-nitrogen mixtures, is then added to the autoclave containing this mixture to provide an oxygen partial pressure of from about 20 to in excess of 500 p.s.i. and preferably about 200 p.s.i. The reaction mixture is then heated for at least about 15 minutes at a temperature of from 140° to 225° C. and preferably about 180° C. The reaction is conducted in the presence of copper sulphate and sodium sulphate. In this manner, about 90% of the spent Cr(III), in the form of $Cr_2O_3$, may be converted into Cr(VI) in the form of ammonium chromate.

After the regeneration of chromic oxide is completed, ammonia is removed from the reaction vessel. Preferably, ammonia and steam are flashed from the reaction vessel. Additional heating at from about 150° to 250° C. can be used to flash off excess ammonia, thereby reducing the pH of the reaction mixture and precipitating copper ions as the insoluble hydroxide. Ammonium dichromate is fromed from ammonium chromate as the ammonia is removed. The flashed ammonia is then recycled to the chromic oxide regeneration vessel.

Having described the invention in general and in terms of a preferred cyclical mode of operation, it is believed that the following detailed examples of preferred procedures will assist towards a better understanding of the process.

The invention will also be better understood by reference to the flow diagram of the process which is set forth in the single figure of the accompanying drawing.

EXAMPLE 1

A mixture of 154 ml. of distilled water, 50.7 g. (0.201 mole) of reagent ammonium dichromate having an initial pH of 3.65 and 9.13 ml. (0.074 mole) of p-xylene were placed in a 300 ml. rocking autoclave and heating to 225° C. The mixture was allowed to react for a period of 60 minutes with continuous rocking of the autoclave.

The reaction products of the p-xylene oxidation were then filtered and acidified with hydrochloric acid to a pH of about 1 to precipitate the aromatic acids. A 97.8% conversion of the p-xylene was obtained and a total mixed acid yield of 86.5% was recovered. Upon analysis, it was found that about two thirds of the mixed acids was terephthalic acid and most of the balance was terephthalamic acid. Base hydrolysis of the mixed acids produced over 99% pure terephthalic acid and ammonia gas.

The acidification of the oxidation products with hydrochloric acid also produced ammonium chloride. This salt was recovered by filtration, purified by recrystallization, and then stored. In large scale commercial processes, the by-product ammonium chloride can be sold, thus rendering the process more attractive than prior methods in which sodium chloride is produced.

EXAMPLE 2

Following the procedure of Example 1, a mixture of 154 ml. of water, 50.7 g. (0.201 mole) of ammonium dichromate and 15.62 gms. (0.10 mole) 2,6-dimethylnaphthalene was added to a 300 ml. rocking autoclave. The reaction was conducted during continuous rocking of the autoclave at 225° C. for one hour. After flashing off excess ammonia, the oxidation reaction filtrate was acidified with hydrochloric acid to a pH of approximately 1 to precipitate naphthalene-2,6-dicarboxylic acid. The yield was 38.8%.

Following the procedure of Example 1, a number of oxidations were conducted using a variety of feedstock materials and varying some of the reaction conditions to determine the effect such changes may have on yield.

The oxidation of o-xylene with aqueous $(NH_4)_2Cr_2O_7$ was conducted following the procedure of Example 1. In each case, 0.201 mole of $(NH_4)_2Cr_2O_7$ and 0.123 mole of o-xylene were reacted in 154 ml. of $H_2O$ for 60 minutes, with an intial pH of about 3.5. The ammonium dichromate solution was free from residual cupric sulphate. The results of a series of such runs at varying temperatures appear in Table 1.

TABLE 1

| Run Number: | Reaction temperature (° C.) | o-Toluic acid, percent yield | o-Toluamide, percent yield | Phthalic acid, percent yield |
|---|---|---|---|---|
| 1-1 | 175 | 3.21 | 0.22 | 0.1 |
| 1-2 | 200 | 9.93 | 1.84 | 2.9 |
| 1-3 | 225 | 11.15 | 4.97 | 1.8 |
| 1-4 | 250 | 4.09 | 3.53 | .2.1 |
| 1-5 | 250 | 6.82 | 5.29 | 1.3 |
| 1-6 | 275 | 20.2 | 5.22 | 0.0 |
| 1-7 | 300 | 19.23 | 6.72 | 1.7 |

From the data of Table 1, it is evident that the major product of the oxidation of o-xylene with ammonium dichromate is o-toluic acid. Relatively minor amounts of o-toluamide and phthalic acid are also produced. The yield of o-toluic acid tends to increase at more elevated temperatures with the highest yield being obtained at 275° C. The yield computed from the results of the experiments reported in Table 1 and Table 2 are based on the mole percent of aromatic acid or amide produced per mole of o-xylene charged.

Another series of runs was conducted under exactly the same conditions as were employed in the reactions reported in Table 1, but the aqueous ammonium dichromate solution contained 6.8 grams of residual cupric sulphate catalyst. The results of this series of reactions are reported in Table 2.

TABLE 2

| Run Number: | Reaction temp. (° C.) | o-Toluic acid, percent yield | o-Toluamide, percent yield | Phthalic acid, percent yield |
|---|---|---|---|---|
| 2-1 | 175 | 0.00 | 0.00 | 0.00 |
| 2-2 | 200 | 3.10 | 7.17 | 0.4 |
| 2-3 | 215 | 6.55 | 13.40 | 0.3 |
| 2-4 | 225 | 1.16 | 8.52 | 0.1 |
| 2-5 | 235 | 2.24 | 10.29 | 0.3 |
| 2-6 | 250 | 0.66 | 1.83 | 0.7 |
| 2-7 | 275 | 0.00 | 0.0 | 0.00 |

It is readily apparent from the data of Table 2 that the presence of a substantial amount of residual copper ions in the oxidant solution sharply reduces the yield of valuable aromatic acids, regardless of variation in temperature. This demonstrates the importance of the copper ion removal step before recirculation of the regenerated oxidant solution.

A number of oxidation reactions were also conducted utilizing p-xylene as the alkyl aromatic compound. Still following the general procedure of Example 1, 0.201 mole of $(NH_4)_2Cr_2O_7$ was reacted with varying amounts of p-xylene in 154 ml. of $H_2O$. The reactions were conducted at a temperature of 225° C. for 60 minutes. The initial pH of each reaction mixture was adjusted to 3.65. The yields are computed as the mole percent of organic acid or amide produced per mole of hydrocarbon charged to the autoclave. Conversion is the mole percent of a given reaction component converted to other products and includes any unrecovered portion of the component. The results of these runs are reported in Table 3.

TABLE 3

| | p-Xylene | | | (NH₄)C₂r₂O₇ p-xylene, mole ratio | Percent yield | | |
|---|---|---|---|---|---|---|---|
| | (Ml.) | Milli-mole | Percent conversion | | Terephthalic acid | Terephthalamic acid | p-Tolu-amide |
| Run Number: | | | | | | | |
| 3-1 | 12.34 | 100 | 92.4 | 2.00 | 59.1 | 13.5 | 3.9 |
| 3-2 | 9.92 | 80.4 | 94.0 | 2.50 | 59.1 | 17.8 | 2.9 |
| 3-3 | 9.29 | 75.4 | | 2.68 | 52.8 | 15.8 | 2.6 |
| 3-4 | 9.13 | 74 | 96.6 | 2.74 | 70.6 | 12.0 | 1.9 |
| 3-5 | 9.13 | 74 | 97.8 | 2.74 | 72.3 | 14.2 | 0 |
| 3-6 | 9.13 | 74 | 97.8 | 2.74 | 70.5 | 13.6 | |
| 3-7 | 8.26 | 67 | | 3.00 | 78.8 | 3.25 | 2.0 |

The data contained in Table 3 indicates that substantial yields of terephthalic acid may be obtained by the oxidation of p-xylene with ammonium dichromate. It also shows that higher yields are obtained at higher mole ratios of $(NH_4)_2Cr_2O_7$ to p-xylene. A commensurate decrease in the yield of secondary products is experienced as the $(NH_4)_2Cr_2O_7$ to p-xylene ratio is increased.

Another series of reactions was conducted to determine the effect of (1) reaction temperature variations and (2) the presence of copper ions, as cupric sulphate, on the oxidation of p-xylene with ammonium dichromate. The same general procedure was employed as in the preceding oxidations. The amount of reactants was the same in each run, 50.7 g. (0.201 mole) of $(NH_4)_2Cr_2O_7$ and 9.13 ml. of p-xylene. The reaction medium contained 6.8 g. of cupric sulphate. The results of these reactions are set forth in Table 4. The percent yield of acids below includes tere-phthalic plus terephthalamic acids.

TABLE 4

| | p-Xylene, ml. | H₂O, ml. | Concentrated NH₄OH, ml. | Reaction temp. (° C.) | p-Xylene, percent conversion | Percent yield | |
|---|---|---|---|---|---|---|---|
| | | | | | | Acids | p-Tolu-amide |
| Run number: | | | | | | | |
| 4-1 | 9.13 | 154 | 0 | 180 | 97.7 | 1.3 | 0 |
| 4-2 | 9.13 | 154 | 0 | 200 | 88.8 | 25.6 | 0 |
| 4-3 | 9.30 | 154 | 0 | 210 | | 37.5 | 6.9 |
| 4-4 | 9.13 | 124 | 30 | 225 | 85.5 | 39.4 | 6.5 |

The data of Table 4 indicate that higher yields of mixed terephthalic and terephthalamic acids are obtained at more elevated temperatures, the maximum yield being obtained at a reaction temperature of 225° C. However, the results are relatively poor when compared with the yields obtained from the reactions reported in Table 3 where an ammonium dichromate oxidant solution substantially free from copper ions is employed. This again demonstrates the importance of the removal of copper ions from the oxidant solution.

A feedstock of 2,6-dimethylnaphthalene was also subjected to oxidation by aqueous ammonium dichromate in another series of reactions conducted according to the general procedure of Example 1. The reaction was conducted with 50.7 g. (0.201 mole) $(NH_4)_2Cr_2O_7$ and varying amounts of 2,6-dimethylnaphthalene in 154 ml. of water. The initial pH of each reaction media was 3.65. In addition to varying the amount of the alkyl aromatic reactant, the reaction times and temperatures were also varied from one run to another. The different conditions employed in each reaction and the results obtained appear in Table 5.

TABLE 5

| | 2,6-dimethylnaphthalene | | | Reaction temperature (° C.) | Reaction time, hours | Naphthalene 2,6-dicarboxylic acid, percent yield |
|---|---|---|---|---|---|---|
| | Grams | Mole | Percent conversion | | | |
| Run number: | | | | | | |
| 5-1 | 15.62 | 0.10 | 59.4 | 225 | 1 | 38.8 |
| 5-2 | 15.62 | 0.10 | 42.9 | 215 | 1 | 24.0 |
| 5-3 | 11.55 | 0.07 | | 225 | 1 | 32.3 |
| 5-4 | 11.55 | 0.07 | 82.7 | 225 | 1 | 33.4 |
| 5-5 | 11.55 | 0.07 | 50.0 | 215 | 1 | 28.8 |
| 5-6 | 11.55 | 0.07 | 52.0 | 200 | 4 | 32.1 |
| 5-7 | 15.62 | 0.10 | 75.0 | 215 | 4 | 50.1 |

As shown in Table 5, substantial amounts of naphthalene-2,6-dicarboxylic acid are produced according to this process. The yield of the acid tends to be higher at more elevated reaction temperatures as may be seen by comparing Run Nos. 5–1 and 5–2, 5–4 and 5–5, 5–3 and 5–5. A comparison of the results of Run Nos. 5–2 and 5–5 also indicates that a higher acid yield is obtained at higher mole ratios of $(NH_4)_2Cr_2O_7$ to 2,6-dimethylnaphthalene. Some improvement in yield at longer reaction times is also evident from a comparison of Run Nos. 5–2 and 5–7.

A further study of the effect of reaction time on the oxidation of 2,6-dimethylnaphthalene was made in a series of reactions in which only the time was varied. In these runs, 50.7 g. (0.201 mole) of $(NH_4)_2Cr_2O_7$ and 15.62 g. (0.10 mole) of 2,6-dimethylnaphthalene in 154 ml. H₂O were reacted at 215° C. The results are set forth in Table 6.

TABLE 6

| | Reaction time, hours | 2,6-diacid yield, mole percent | 2,6-dimethyl-naphthalene percent conversion | 2,6-diacid selectivity |
|---|---|---|---|---|
| Run Number: | | | | |
| 6-1 | 1 | 24.0 | 42.9 | 0.560 |
| 6-2 | 2 | 40.29 | 64.4 | 0.635 |
| 6-3 | 4 | 50.1 | 75.05 | 0.667 |
| 6-4 | 6 | 60.2 | 80.4 | 0.749 |
| 6-5 | 8 | 46.1 | 78.6 | 0.586 |

The data of Table 6 demonstrates that the yield of the dicarboxylic acid increases with increase in the reaction time up to about 6 hours. A corresponding increase in 2,6-dicarboxylic acid selectivity is also experienced as the time is increased progressively from 1 to 6 hours in Run Nos. 6–1 through 6–4. However, between 6 and 8 hours reaction time, a decrease in yield and selectivity is noted, due perhaps to some degradation or recombination of the products. In this context, selectivity refers to the fraction of converted 2,6-dimethylnaphthalene that is oxidized to naphthalene 2,6-dicarboxylic acid.

A feedstock of m-xylene was also oxidized with aqueous $(NH_4)_2Cr_2O_7$. In these reactions, 50.7 g. (0.201 mole) $(NH_4)_2Cr_2O_7$ and 9.13 ml. (0.074 mole) m-xylene in 154 ml. $H_2O$ were reacted for 60 minutes. The results appear in Table 7.

TABLE 7

| Run Number: | Reaction temp. (° C.) | m-Xylene, percent conversion | m-Tolu-amide, percent yield | Isophthalic acid, percent yield | Isophthal-amic acid, percent yield |
|---|---|---|---|---|---|
| 7-1 | 215 | 93.2 | 4.1 | 62.7 | 20.0 |
| 7-2 | 225 | 93.9 | 2.8 | 61.0 | 13.5 |
| 7-3 | 235 | | 1.8 | 63.0 | 27.2 |

The data in Table 7 shows that a substantial yield of isophthalic acid is obtained by the oxidation of m-xylene according to this process. A significant yield of isophthalamic acid is also produced. The variation in temperature from 215° C. to 235° C. does not produce a great increase in diacid yield, but a large yield of isophthalamic acid was secured at 235° C.

Mixed xylenes (50% m-, 25% o- and 25% p-xylene) were also subjected to ammonium dichromate oxidation and substantial amounts of mixed acids were produced.

A number of other feedstocks were oxidized according to the present process with good results. In each case, 50.7 g. (0.201 mole) $(NH_4)_2Cr_2O_7$ was reacted with the feedstock in 154 ml. $H_2O$ for 60 minutes. The results of these reactions are set forth in Table 8. In this data, weight percent yield is $$\frac{\text{weight of product}}{\text{weight of starting material}} \times 100.$$

TABLE 8

| Run Number: | Org. start. material | Temperature (° C.) | Products | Conversion, percent |
|---|---|---|---|---|
| 8-1 | 0.050 mole durene | 225 | 6.56 wt. percent yield mixed acids including pyromellitic acid. | 90.5 |
| 8-2 | do | 225 | 11.78 wt. percent yield mixed acids including pyromellitic acid. | 87.2 |
| 8-3 | 15.5 ml. LCCO extract | 215 | 12.5 wt. percent yield mixed acids | |
| 8-4 | 0.1 mole cyclohexanol | 215 | 18.0% adipic acid | |

As mentioned before, when the pH of the reaction media is in excess of about 7, substantially increased yields of carboxylic acid amides can be produced. This embodiment of our invention will be better understood by resorting to the following examples and tables.

EXAMPLE 3

300 ml. rocking bomb was charged with 9.13 ml. p-xylene, 50.7 g. ammonium dichromate, 100 ml. concentrated ammonium hydroxide (30% $NH_3$) and 54 ml. distilled water. The pH of the aqueous phase before reaction was 10.42. The reaction mixture was then heated at 225° C. for 60 minutes, after which the pH of the aqueous phase was 10.75. The aqueous effluent remaining after the completion of the oxidation reaction was refluxed and then acidified to $pH_1$ with concentrated HCl. A 20.7% yield of terephthalamic acid was produced, based on charged p-xylene and determined by the neutralization equivalent of the product.

Following the general procedure of Example 3, a number of other oxidation reactions were conducted using p-xylene feedstock. The only departure from Example 3 was in the adjustment of the initial pH by the addition of ammonia or sulphuric acid from run to run. Otherwise, the same amounts of reactants and the same reaction condition was employed. The results appear in Table 9. The results of Example 3 are also included in the table for purposes of comparison.

TABLE 9

| | Initial pH | Final pH | p-Tolu-amide, percent yield | Tereph-thalamic acid, percent yield | Tereph-thalic acid, percent yield | p-Xylene, percent conversion |
|---|---|---|---|---|---|---|
| Run Number: | | | | | | |
| 9-1 | 1.42 | 8.95 | 1.3 | 11.1 | 73.2 | 95.1 |
| 9-2 | 2.00 | 8.95 | 0.2 | 11.1 | 73.6 | 93.9 |
| 9-3 | 2.90 | 9.20 | 1.5 | 11.8 | 76.8 | 95.5 |
| 9-4 | 3.65 | 9.05 | 1.9 | 12.0 | 70.6 | 96.6 |
| 9-5 | 7.08 | 10.08 | 3.8 | 17.0 | 68.8 | 96.1 |
| 9-6 | 9.45 | 10.13 | 5.2 | 18.9 | 61.6 | 97.4 |
| Example 3 | 10.42 | 10.75 | 5.4 | 20.7 | 49.0 | 99.0 |

From the data in Table 9, it is evident that a sharply increased yield of terephthalamic acid and p-toluamide is obtained at pH levels above about 7. At lower pH levels, Run Nos. 9–1 through 9–4, aromatic acid production is favored.

In the present data, yield is the mole percent of product per mole of alkyl aromatic compound charged. Conversion is the percent of a given reaction component converted to other products including any unaccounted for portion of the reaction component.

Reactions were also conducted according to the procedure of Example 3 using o-xylene as the feedstock. In each case, 9.32 ml. of o-xylene was mixed with 50.7 g. of ammonium dichromate in 154 ml. of water. The initial pH of the reaction mixture was adjusted to the desired level by the addition of 10% $H_2SO_4$ or 58% $NH_4OH$ to the reaction mixture. The reaction was carried out at 225° C. for 60 minutes. The results of the runs appear in Table 10.

TABLE 10

| | Initial pH | Final pH | o-Toluic acid, percent | o-Tolu-amide, percent | Phthalic acid, percent |
|---|---|---|---|---|---|
| Run Number: | | | | | |
| 10-1 | 2.01 | 9.25 | 15.2 | 6.4 | 4.0 |
| 10-2 | 7.48 | 9.95 | 15.2 | 15.4 | 4.3 |
| 10-4 | 10.20 | 9.90 | 14.2 | 15.2 | 4.2 |

The data of Table 10 clearly shows that more than twice as much o-toluamide is produced by reaction at a pH above 7, than is formed at lower relatively acidic pH levels.

EXAMPLE 4

A 300 ml. rocking bomb was charged with 8.90 ml. of a feedstock of mixed xylenes, containing 50% m-xylene, 25% o-xylene, and 25% p-xylene, and 50.7 g. $(NH_4)_2Cr_2O_7$ in 154 ml. of water. The pH of the mixture was adjusted to 2.0 by additions of $H_2SO_4$ and/or $NH_4OH$. The mixture was then reacted at 225° C. for 60 minutes. A yield of 3.8% of mixed amides was obtained.

EXAMPLE 5

Example 4 was repeated, but the initial pH of the reaction mixture was adjusted to 6.9. A yield of 6.6% of mixed amides was obtained.

EXAMPLE 6

Example 4 was repeated, but the initial pH of the reaction mixture was adjusted to 9.8. A yield of 7.9% of mixed amides was obtained.

The results of Examples 4, 5 and 6 also demonstrate that conducting the oxidation of alkylaromatic compounds at a pH about 7 or higher results in a substantial increase in amide yield over that obtained by reacting at relatively acid pH levels.

It will be understood that various changes in the details of the process may be made by those skilled in the art without departing from the spirit of our invention. It is our intention, therefore, to be limited only as indicated by the scope of the following claims.

What is claimed is:

1. The method of oxidizing o-xylene to o-toluic acid comprising:
   mixing said o-xylene with aqueous ammonium dichromate, the equivalent ratio of said ammonium dichromate to oxidizable carbon atoms in said o-xylene being in the range of from 0.5:1 to 3:1,
   heating said o-xylene and aqueous ammonium dichromate in an oxidation reactor at a temperature of from 200° to 325° for at least 15 minutes to produce an aqueous phase containing the dissolved ammonium salt of o-toluic acid and to precipitate chromic oxide,
   mixing said chromic oxide with aqueous ammonia, the mole ratio of said ammonia to said chromic oxide being in the range of from 2 to 160,
   heating the mixture of chromic oxide and aqueous ammonia in an autoclave in the presence of a cupric sulphate catalyst and sodium sulphate to a temperature in the range of from 140° to 225° C., under an oxygen partial pressure of from 20 to 500 p.s.i., to produce aqueous ammonium chromate containing some dissolved cupric sulphate,
   heating said aqueous ammonium chromate to form aqueous ammonium dichromate and ammonia and to precipitate hydrated cupric oxide,
   recycling said aqueous ammonium dichromate to said oxidation reactor for the oxidation of additional o-xylene, and
   acidifying said aqueous phase containing the dissolved ammonium salt of o-toluic acid to precipitate said o-toluic acid.

2. The method of oxidizing p-xylene to terephthalic acid comprising:
   mixing said p-xylene with aqueous ammonium dichromate, the equivalent ratio of said ammonium dichromate to oxidizable carbon atoms in said p-xylene being in the range of from 0.5:1 to 3:1,
   heating said p-xylene and aqueous ammonium dichromate in an oxidation reactor at a temperature of from 200° to 325° for at least 15 minutes to produce an aqueous phase containing the dissolved ammonium salt of terephthalic acid and to precipitate chromic oxide,
   mixing said chromic oxide with aqueous ammonia, the mole ratio of said ammonia to said chromic oxide being in the range of from 2 to 160,
   heating the mixture of chromic oxide and aqueous ammonia in an autoclave in the presence of a cupric sulphate catalyst and sodium sulphate to a temperature in the range of from 140° to 225° C., under an oxygen partial pressure of from 20 to 500 p.s.i., to produce aqueous ammonium chromate containing some dissolved cupric sulphate,
   heating said aqueous ammonium chromate to form aqueous ammonium dichromate and ammonia and to precipitate hydrated cupric oxide,
   recycling said aqueous ammonium dichromate to said oxidation reactor for the oxidation of additional p-xylene and
   acidifying said aqueous phase containing the dissolved ammonium salt of terephthalic acid to precipitate said terephthalic acid.

3. The method of oxidizing cyclohexanol to adipic acid comprising:
   mixing said cyclohexanol with aqueous ammonium dichromate, the equivalent ratio of said ammonium dichromate to oxidizable carbon atoms in said cyclohexanol being in the range of from 0.5:1 to 3:1,
   heating said cyclohexanol and aqueous ammonium dichromate in an oxidation reactor at a temperature of from 200° to 325° for at least 15 minutes to produce an aqueous phase containing the dissolved ammonium salt of adipic acid and to precipitate chromic oxide,
   mixing said chromic oxide with aqueous ammonia, the mole ratio of said ammonia to said chromic oxide being in the range of from 2 to 160,
   heating the mixture of chromic oxide and aqueous ammonia in an autoclave in the presence of a cupric sulphate catalyst and sodium sulphate to a temperature in the range of from 140° to 225° C., under an oxygen partial pressure of from 20 to 500 p.s.i., to produce aqueous ammonium chromate containing some dissolved cupric sulphate,
   heating said aqueous ammonium chromate to form aqueous ammonium dichromate and ammonia and to precipitate hydrated cupric oxide,
   recycling said aqueous ammonium dichromate to said oxidation reactor for the oxidation of additional cyclohexanol, and
   acidifying said aqueous phase containing the dissolved ammonium salt of adipic acid to precipitate said adipic acid.

References Cited

UNITED STATES PATENTS

| | | | |
|---|---|---|---|
| 2,005,774 | 6/1935 | Demant | 260—524 |
| 3,282,992 | 11/1966 | Harris | 260—524 |
| 3,335,178 | 8/1967 | Taussig et al. | 260—524 |

LORRAINE A. WEINBERGER, Primary Examiner

L. A. THAXTON, Assistant Examiner

U.S. Cl. X.R.

260—518, 531, 533, 558

UNITED STATES PATENT OFFICE
CERTIFICATE OF CORRECTION

Patent No. 3,560,559  Dated February 2, 1971

Inventor(s) A. L. Benham et al

It is certified that error appears in the above-identified patent and that said Letters Patent are hereby corrected as shown below:

| | |
|---|---|
| Col. 1, line 54: | Insert "acid" after "carboxyl" and before "amides". |
| Col. 2, line 14: | Delete "3,393,992" and insert --3,393,972--. |
| Col. 2, line 19: | Delete "mesiylene" and insert --mesitylene--. |
| Col. 3, line 33: | Delete "fromed" and insert --formed--. |
| Col. 4, Table 1 line 27: | Delete "2.1" and insert --1.1--. |
| Col. 5, Table 3 line 8: | Delete "$(NH_4)C_2r_2O_7$" and inse --$(NH_4)_2Cr_2O_7$--. |
| Col. 5, line 14: under "p-Toluamide" | Delete "3.9" and insert --3. |

Signed and sealed this 20th day of July 1971.

(SEAL)
Attest:

EDWARD M. FLETCHER, JR.
Attesting Officer

WILLIAM E. SCHUYLER, J
Commissioner of Patent